United States Patent
Shao et al.

(10) Patent No.: US 12,126,732 B2
(45) Date of Patent: Oct. 22, 2024

(54) BLOCKCHAIN CONSENSUS METHOD, DEVICE AND SYSTEM

(71) Applicant: JINGDONG TECHNOLOGY HOLDING CO., LTD., Beijing (CN)

(72) Inventors: Zhuguang Shao, Beijing (CN); Haibo Sun, Beijing (CN); Guangwei Zhao, Beijing (CN); Haiquan Huang, Beijing (CN); Lin Zhang, Beijing (CN)

(73) Assignee: JINGDONG TECHNOLOGY HOLDING CO., LTD., Beijing (CN)

( * ) Notice: Subject to any disclaimer, the term of this patent is extended or adjusted under 35 U.S.C. 154(b) by 257 days.

(21) Appl. No.: 17/616,543

(22) PCT Filed: Mar. 3, 2020

(86) PCT No.: PCT/CN2020/077518
§ 371 (c)(1),
(2) Date: Dec. 3, 2021

(87) PCT Pub. No.: WO2020/258912
PCT Pub. Date: Dec. 30, 2020

(65) Prior Publication Data
US 2022/0239496 A1 Jul. 28, 2022

(30) Foreign Application Priority Data
Jun. 26, 2019 (CN) .......................... 201910560228.9

(51) Int. Cl.
*H04L 9/32* (2006.01)
*H04L 9/00* (2022.01)

(52) U.S. Cl.
CPC .............. *H04L 9/3247* (2013.01); *H04L 9/50* (2022.05)

(58) Field of Classification Search
CPC ................................ H04L 9/3247; H04L 9/50
(Continued)

(56) References Cited

U.S. PATENT DOCUMENTS
2018/0349621 A1* 12/2018 Schvey .................... H04L 63/04
2019/0251199 A1* 8/2019 Klianev ................. G06Q 40/04
(Continued)

FOREIGN PATENT DOCUMENTS
CN 107392608 A 11/2017
CN 108134706 A 6/2018
(Continued)

OTHER PUBLICATIONS

Feng, et al., "Scalable Dynamic Multi-Agent Practical Byzantine Fault-Tolerant Consensus in Permissioned Blockchain," Applied Sciences, published Oct. 14, 2018 (21 pages).
(Continued)

*Primary Examiner* — Kambiz Zand
*Assistant Examiner* — Phuc Pham
(74) *Attorney, Agent, or Firm* — Michael Best & Friedrich LLP

(57) ABSTRACT

The invention, which discloses a blockchain consensus method, apparatus and system, relates to the technical field of computers. A specific implementation mode of the method comprises: a leader node in the same network as a client receiving a transaction message sent by the client and a transaction message sent by at least one peer node, or receiving transaction messages sent by at least two peer nodes; sending the transaction messages to a leader node in a previous-level network till the priority of the previous-level network is the highest if transaction data in the transaction messages are consistent; a leader node in a highest-priority network generating a proposal message according to the received transaction messages, and performing a consensus judgment on the proposal message based on a Byzantine fault-tolerant consensus mechanism; sending the proposal message to a leader node in a next-level network till the next-level network is the network where the
(Continued)

client is located after the success in the consensus judgment. The implementation mode can solve the technical problems of a long transaction confirmation time and a small transaction volume carried by a block.

11 Claims, 7 Drawing Sheets

(58) Field of Classification Search
USPC .......................................................... 713/176
See application file for complete search history.

(56) References Cited

U.S. PATENT DOCUMENTS

| | | | | |
|---|---|---|---|---|
| 2019/0305957 | A1* | 10/2019 | Reddy | G06F 8/60 |
| 2020/0117823 | A1* | 4/2020 | Ojha | G06Q 20/3825 |

FOREIGN PATENT DOCUMENTS

| | | |
|---|---|---|
| CN | 108665365 A | 10/2018 |
| CN | 108984662 A | 12/2018 |
| CN | 109039847 A | 12/2018 |
| CN | 109819003 A | 5/2019 |
| WO | 2018125989 A2 | 7/2018 |
| WO | 2018177264 A1 | 10/2018 |

OTHER PUBLICATIONS

International Preliminary Report on Patentability for Related Application No. PCT/CN2020/077518 dated Dec. 28, 2021 (10 pages, including an English tralsation).
International Search Report and Written Opinion for Related Application No. PCT/CN2020/077518 dated May 26, 2020 (14 pages, including an English translation).
Japanese Patent Office Action for Related Application No. 2021568814 dated Jan. 5, 2023 (13 pages, including an English translation).
Korean Patent Office Action for Related Application No. 10-2021-7040523 dated Mar. 13, 2023 (34 pages, including an English translation).
Japanese Patent Office Final Notice of Reasons for Rejection for Application No. 2021-568814, dated Aug. 1, 2023 (3 pages).

* cited by examiner

BLOCKCHAIN CONSENSUS METHOD, DEVICE AND SYSTEM

CROSS-REFERENCE TO RELATED APPLICATION(S)

This is a U.S. national stage entry of International Patent Application No. PCT/CN2020/077518, filed on Mar. 3, 2020, which claims priority to Chinese Patent Application No. 201910560228.9, filed on Jun. 26, 2019, the entire contents of each of which are fully incorporated herein by reference.

TECHNICAL FIELD

The invention relates to the technical field of blockchains, and in particular relates to a blockchain consensus method, apparatus and system.

BACKGROUND ART

With the rapid development of blockchain technology, more and more data are stored and interacted using blockchains. In the design of blockchains, a consensus mechanism has always been a technical difficulty, especially in a peer-to-peer network environment.

A consensus just means that the participating nodes are in the same state, and it is to mainly ensure in a blockchain that the sequence of requested transactions is globally consistent. For a blockchain system, a peer-to-peer network can be understood as a public network, and the current common peer-to-peer network consensus solutions are Proof Of Work (POW) and Proof of Stake (POS).

During the implementation of the invention, it is found by the inventor that at least the following problems exist in the prior art: a comparatively low performance, a small transaction volume carried by each block, and a long confirmation time for each transaction; energy consumption, and a serious waste of energy caused by use of mining mechanisms.

SUMMARY OF THE INVENTION

In view of this, the embodiment of the invention provides a blockchain consensus method, apparatus, and system to solve the technical problems of a long transaction confirmation time and a small transaction volume carried by a block.

In order to achieve the aforesaid objects, according to one aspect of the embodiment of the invention, a blockchain consensus method, which is applied to a leader node in the same network as a client, is provided, the method comprising: receiving a transaction message sent by the client and a transaction message sent by at least one peer node, or receiving transaction messages sent by at least two peer nodes, wherein the peer node is in the same network as both of the leader node and the client; determining whether the received transaction messages are consistent, and if so, sending the transaction messages to a leader node in a previous-level network.

According to another aspect of the embodiment of the invention, a blockchain consensus method, which is applied to a leader node in a highest-priority network, is further provided, the method comprising: generating a proposal message according to received transaction messages; performing a consensus judgment on the proposal message based on a Byzantine fault-tolerant consensus mechanism; sending the proposal message to a leader node in a next-level network after the success in the consensus judgment.

According to another aspect of the embodiment of the invention, a blockchain consensus method, which is applied to a leader node in a medium-priority network, is further provided, the method comprising: receiving a proposal message sent by a leader node in a highest-priority network, and performing a signature verification on the proposal message; writing transaction data in the proposal message in a block, attaching a signature of the leader node to the proposal message, and sending the proposal message to a peer node in the same network as the leader node and a leader node in a next-level network till the next-level network is the network where the client is located after the success in the signature verification.

According to another aspect of the embodiment of the invention, a blockchain consensus method, which is applied to a peer node in the same network as a client, is further provided, the method comprising: receiving a transaction message sent by the client, and performing a signature verification on the transaction message; attaching a signature of the peer node to the transaction message, and sending the transaction message to a leader node in the same network as the peer node after the success in the signature verification.

According to another aspect of the embodiment of the invention, a blockchain consensus apparatus, which is provided in a leader node in the same network as a client, is provided, the apparatus comprising: a first receiving module for receiving a transaction message sent by the client and a transaction message sent by at least one peer node, or receiving transaction messages sent by at least two peer nodes, wherein the peer node is in the same network as both of the leader node and the client; a first sending module for determining whether the received transaction messages are consistent, and if so, sending the transaction messages to a leader node in a previous-level network.

According to another aspect of the embodiment of the invention, a blockchain consensus apparatus, which is provided in a leader node in a highest-priority network, is further provided, the apparatus comprising: a proposal module for generating a proposal message according to received transaction messages; a consensus module for performing a consensus judgment on the proposal message based on a Byzantine fault-tolerant consensus mechanism; a second sending module for sending the proposal message to a leader node in a next-level network after the success in the consensus judgment.

According to another aspect of the embodiment of the invention, a blockchain consensus apparatus, which is provided in a leader node in a medium-priority network, is further provided, the apparatus comprising: a second receiving module for receiving a proposal message sent by a leader node in a highest-priority network, and performing a signature verification on the proposal message; a writing module for writing transaction data in the proposal message in a block, attaching a signature of the leader node to the proposal message, and sending the proposal message to a peer node in the same network as the leader node and a leader node in a next-level network till the next-level network is the network where the client is located after the success in the signature verification.

According to another aspect of the embodiment of the invention, a blockchain consensus apparatus, which is provided in a peer node in the same network as a client, is further provided, the apparatus comprising: a third receiving module for receiving a transaction message sent by the client, and performing a signature verification on the transaction message; a third sending module for attaching a signature of the peer node to the transaction message, and sending the transaction message to a leader node in the same network as the peer node after the success in the signature verification.

According to another aspect of the embodiment of the invention, an electronic device is further provided, the electronic device comprising: one or more processors; a storage means for storing one or more programs, the one or more programs, when executed by the one or more processors, causing the one or more processors to implement the method according to any of the aforesaid embodiments.

According to another aspect of the embodiment of the invention, a computer-readable medium, on which a computer program is stored, is further provided, the program, when executed by a processor, implementing the method according to any of the aforesaid embodiments.

According to another aspect of the embodiment of the invention, a blockchain consensus method is further provided, the method comprising: a client sending a transaction message to at least two nodes in the same network as the client, wherein the at least two nodes include at least two of leader nodes and peer nodes; a leader node in the same network as the client receiving the transaction message sent by the client and a transaction message sent by at least one of the peer nodes, or receiving transaction messages sent by at least two of the peer nodes; sending the transaction messages to a leader node in a previous-level network till the priority of the previous-level network is the highest if transaction data in the transaction messages are consistent; a leader node in a highest-priority network generating a proposal message according to the received transaction messages, and performing a consensus judgment on the proposal message based on a Byzantine fault-tolerant consensus mechanism; sending the proposal message to a leader node in a next-level network till the next-level network is the network where the client is located after the success in the consensus judgment.

In addition, according to another aspect of the embodiment of the invention, a blockchain consensus system is provided, the system comprising: a client for sending a transaction message to at least two nodes in the same network as the client, wherein the at least two nodes include at least two of leader nodes and peer nodes; a leader node in the same network as the client for receiving the transaction message sent by the client and a transaction message sent by at least one of the peer nodes, or receiving transaction messages sent by at least two of the peer nodes; sending the transaction messages to a leader node in a previous-level network till the priority of the previous-level network is the highest if transaction data in the transaction messages are consistent; a leader node in the highest-priority network for generating a proposal message according to the received transaction messages, and performing a consensus judgment on the proposal message based on a Byzantine fault-tolerant consensus mechanism; sending the proposal message to a leader node in a next-level network till the next-level network is the network where the client is located after the success in the consensus judgment.

The aforesaid one embodiment in the invention has the following advantages or beneficial effects: since a technical means of performing a consensus judgment on the proposal message based on a Byzantine fault-tolerant consensus mechanism, and sending the proposal message to a leader node in a next-level network till the next-level network is the network where the client is located after the success in the consensus judgment is adopted, the technical problems of a long transaction confirmation time and a small transaction volume carried by a block in the prior art are overcome. The embodiment of the invention, on the premise of using a cryptographic algorithm to ensure data consistency in a peer-to-peer network environment, performs a consensus based on the Byzantine fault-tolerant consensus mechanism, which can effectively improve the consensus efficiency; in the actual consensus process, fits well with a peer-to-peer network on the one hand, and can reduce a waste of resources caused by mining on the other hand by adopting a hierarchical regional consensus mechanism in a manner of reaching a consensus in a small range and issuing broadcasts, thereby effectively improving the consensus efficiency.

Further effects of the aforesaid non-conventional optional manners will be described below in combination with specific implementation modes.

BRIEF DESCRIPTION OF THE DRAWINGS

Figures are used to better understand the invention, and do not form improper limitations of the invention. Where.

DETAILED DESCRIPTION

The exemplary embodiments of the invention, including various details of the embodiment of the invention, are described below in combination with the figures to facilitate understanding, and shall be considered to be exemplary ones only. Thus, those skilled in the art should recognize that various changes and modifications may be made to the embodiments described herein without departing from the scope and spirit of the invention. Similarly, for clarity and conciseness, descriptions of well-known functions and structures are omitted in the descriptions below.

Figure 1:
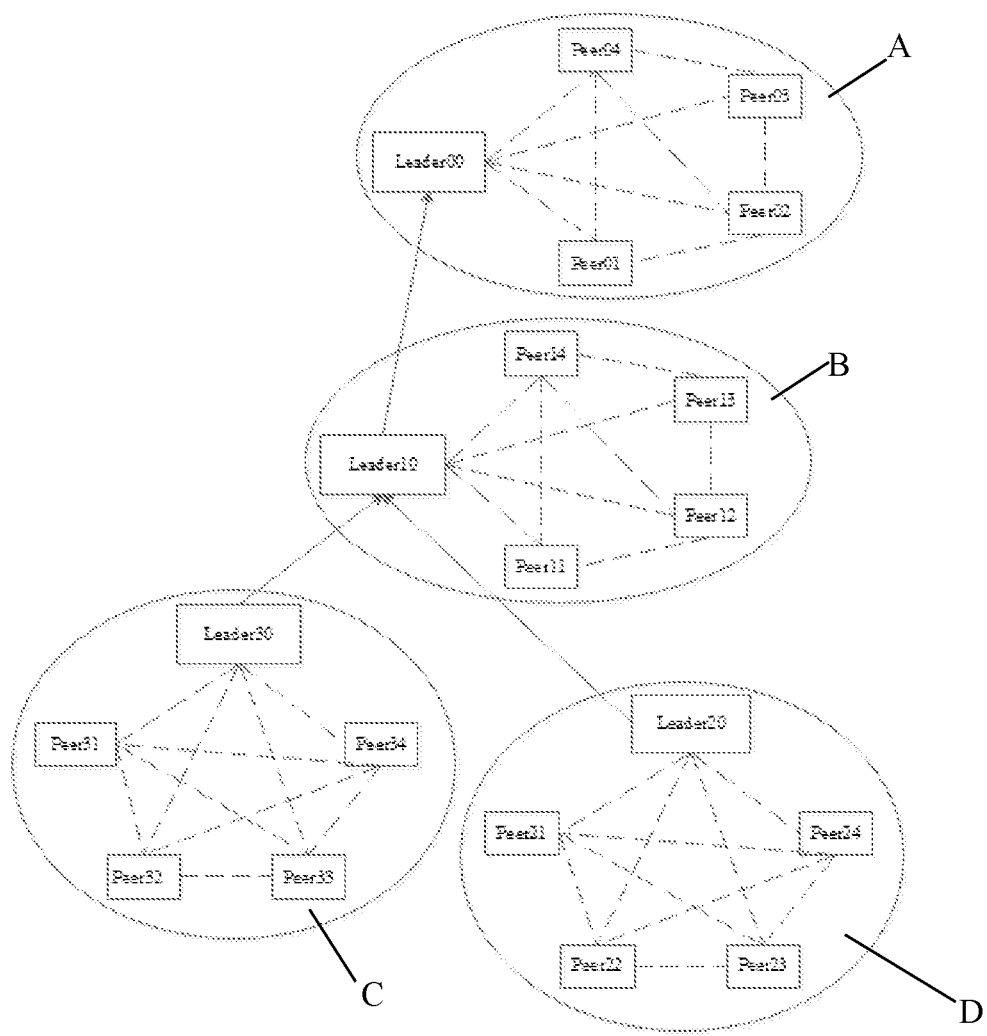
FIG. 1 is a framework diagram of a blockchain consensus system according to an embodiment of the invention.

FIG. 1 is a framework diagram of a blockchain consensus system according to an embodiment of the invention. As shown in FIG. 1, a peer-to-peer network (i.e., a public network) includes a plurality of sub-networks, and each sub-network has a different priority. FIG. 1 exemplarily shows three-level sub-networks. For example, the priority of the sub-network A is higher than the priority of the sub-network B, and the priority of the sub-network B is higher than the priority of the sub-network C. Due to different network ranges of blockchain applications, the number of priorities of each sub-network is not limited to three as shown in FIG. 1, and may be more or less, and there may be multiple sub-networks with the same priority, which is not limited in the embodiments of the invention. The public network is just the Internet, which is a collection of computer networks formed by interconnecting computer networks (including local area networks and metropolitan area networks) in different locations and sizes around the world. In the embodiments of the invention, the sub-network may be a local area network, a metropolitan area network, or the like.

In the embodiments of the invention, each sub-network has a leader node (Leader) and a plurality of peer nodes (Peer), and both the Peer node and the Leader node can receive transaction messages issued by a client. The Leader node is a hierarchical structure, the lower-level Leader node can know the upper-level Leader node, and the upper-level Leader node can also know the set of lower-level Leader nodes; each Leader node can know all the Peer nodes in the same sub-network; each Peer node can know the other Peer nodes in the same sub-network and the Leader node in the same sub-network. Thus, the priority of the sub-network in which the Leader node participates decides the priority of the Leader node.

For example, in a local area network environment, there may be only one node that can communicate with external networks. This node is just the Leader node of the local area network, the other nodes in the local area network are the Peer nodes, and each Peer node has an equal status.

The Leader node is not changeless. When the Peer node detects an abnormality of the Leader node in the current network environment, a re-election can be performed by a Raft protocol and the like, but the Leader nominated in the election process must have a network authority of access to the upper-level Leader. If the Leader node detects that a parent Leader node corresponding to the node is abnormal (e.g., the network is unavailable), it can make broadcasts to the surrounding available networks, and other Leader nodes in the surrounding networks will send responses after receiving the broadcasts, and then the Leader node changes the corresponding parent Leader node.

Figure 2:
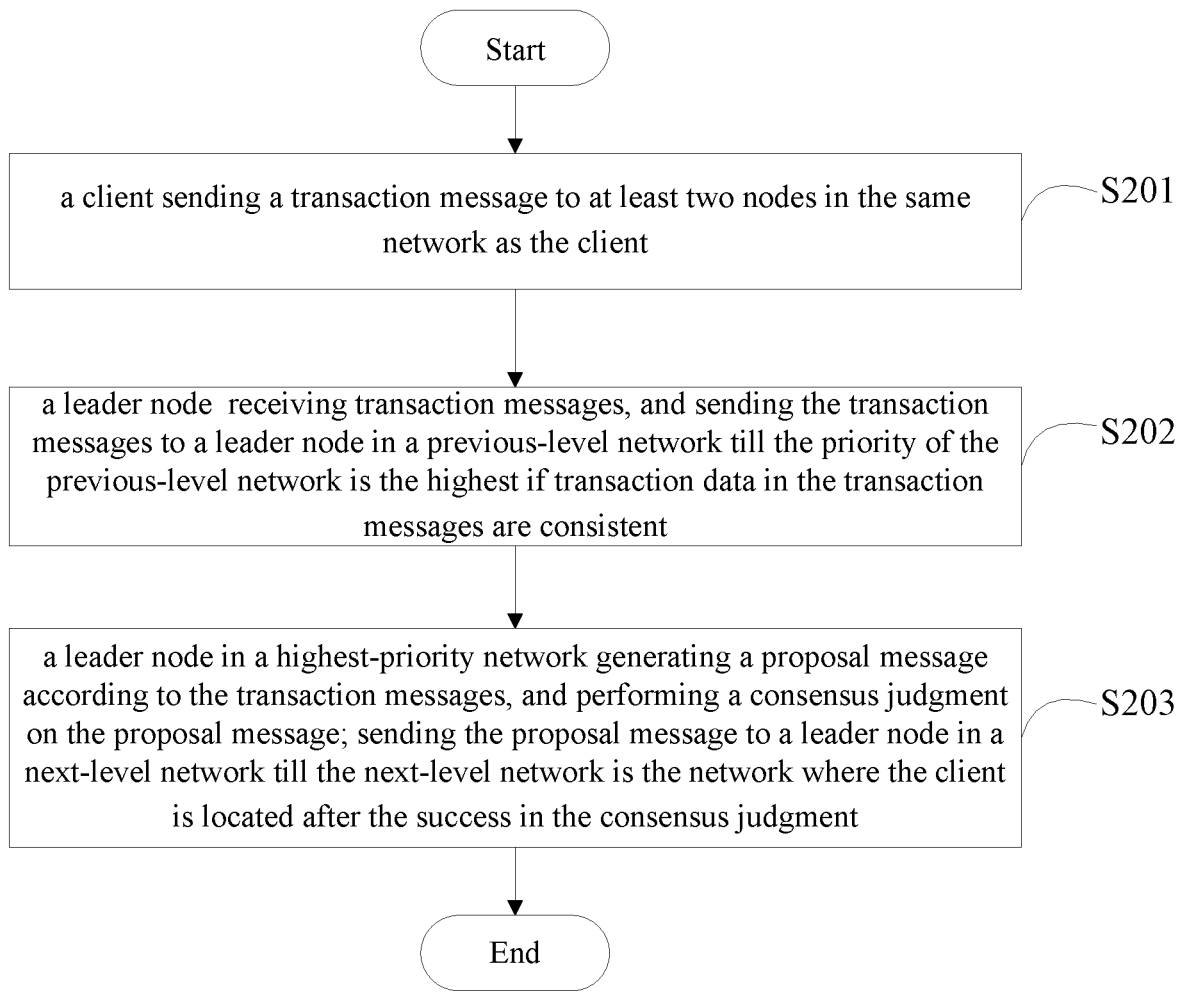
FIG. 2 is a schematic diagram of a main process of a blockchain consensus method according to an embodiment of the invention.

FIG. 2 is a schematic diagram of a main process of a blockchain consensus method according to an embodiment of the invention. As an embodiment of the invention, as shown in FIG. 2, the blockchain consensus method may comprise:

Step 201: a client sending a transaction message to at least two nodes in the same network as the client.

After ensuring the legitimacy of the transaction message, the client sends the transaction message to at least two nodes (Peer or Leader nodes) that are in the same network as the client to prevent individual nodes from cheating. Specifically, the client can send the transaction message to the Leader node and at least one Peer node, and can also send the transaction message to at least two Peer nodes. It should be noted that the client can only send the transaction message to nodes that have established connections with the client.

As shown in FIG. 1, assuming that the client is in the sub-network C, the client will send the transaction message to at least two nodes in the sub-network C, such as Peer31, Peer32, Peer33 and the like in the sub-network C, or Leader30, Peer31, Peer32, Peer34 and the like in the sub-network C.

Optionally, the transaction message includes transaction data and a signature of the client. A cryptographic algorithm can be adopted to process the transaction data to ensure data consistency. Specifically, the transaction data can be first subjected to Hash processing, and then the Hash value is processed using a private key of the client to thereby obtain the signature of the client. If a public key of the client is not broadcast to each node in advance, the transaction message should also include the public key of the client for the node to verify the signature of the client.

Step 202: a leader node in the same network as the client receiving the transaction message sent by the client and a transaction message sent by at least one of the peer nodes, or receiving transaction messages sent by at least two of the peer nodes; sending the transaction messages to a leader node in a previous-level network till the priority of the previous-level network is the highest if transaction data in the transaction messages are consistent.

Optionally, a leader node in the same network as the client receiving the transaction message sent by the client and a transaction message sent by at least one of the peer nodes, or receiving transaction messages sent by at least two of the peer nodes, comprises: a peer node in the same network as a client receiving a transaction message sent by the client, and performing a signature verification on the transaction message; attaching a signature of the peer node to the transaction message, and sending the transaction message to a leader node in the same network as the peer node after the success in the signature verification; or the leader node in the same network as the client receiving the transaction message sent by the client and the transaction message sent by at least one of the peer nodes, and performing a signature verification on the transaction messages, respectively; or receiving the transaction messages sent by at least two of the peer nodes, and performing a signature verification on the transaction messages, respectively.

Since in step 201, the client sends the transaction message to the Peer node, the Peer node verifies the signature of the client by the public key of the client after receiving the transaction message sent by the client. Specifically, the transaction data in the transaction message is subjected to Hash processing, and it is compared whether the Hash value is consistent with the signature decrypted by the public key. If there is a success in the signature verification, the signature of the Peer signature is attached to the transaction message, and the transaction message after the attachment of the signature of the Peer signature is sent to the Leader node in the same network as the Peer node. Thus, the Leader node will receive the transaction message sent by the Peer node (forwarded by one or more Peer nodes), and may also receive the transaction message sent by the client, that is, the Leader node will receive at least two transaction messages.

If the Leader node receives the transaction message sent by the Peer node, it first verifies the signature of the Peer node, and then performs a signature verification on the signature of the client after the success in the signature verification to thereby obtain transaction data. The first signature verification is to verify that the transaction message forwarded by the Peer node has not been tampered with during network transmission to ensure the authenticity of the transaction message forwarded by the Peer node; the second signature verification is to verify that the transaction data in the transaction message is sent by the client. If the Leader node receives the transaction message sent by the client, it is only required to verify the signature of the client to thereby obtain the transaction data.

If it is determined that the transaction data in the transaction messages are consistent, the Leader node will determine whether the Leader node itself has a parent Leader, and assuming that there is the parent Leader, it will add its own signature to the transaction messages and send the transaction messages to the parent Leader; the parent Leader will also perform the same operations (including the signature verification and the signature attachment) after receiving the messages till the current Leader node is the highest-level Leader. A verification of the respective transaction messages by the Leader node can ensure the consistency of the transaction data. It should be noted that the patent Leader is required to verify the respective signatures in the transaction message in sequence to ensure that the transaction data sent by the client has not been tampered with.

Optionally, sending the transaction messages to a leader node in a previous-level network till the priority of the previous-level network is the highest if transaction data in the transaction messages are consistent, comprises: a leader node in the same network as the client determining whether the transaction data in the respective transaction messages received are consistent based on a majority principle; if so, attaching a signature of the leader node to the transaction messages, and sending the transaction messages to the leader node in the previous-level network; the leader node in the previous-level network performing a signature verification on the received transaction messages; attaching the signature of the leader node to the transaction messages, and sending the transaction messages to the leader node in the previous-level network till the priority of the previous-level network is the highest after the success in the signature verification. The Leader node acquires the transaction data in the respective transaction messages by means of the signature verification, and determines whether the transaction data in the respective transaction messages are consistent. For example, the Leader node can determine whether the plurality of transaction data received are consistent based on the majority principle. If it is confirmed that the transaction data are consistent, the transaction messages that are deemed to have not been tampered with are packaged into one transaction message, which is sent to the parent Leader after the attachment of the signature of the Leader node.

Step 203: a leader node in a highest-priority network generating a proposal message according to the received transaction messages, and performing a consensus judgment on the proposal message based on a Byzantine fault-tolerant consensus mechanism (BFT); sending the proposal message to a leader node in a next-level network till the next-level network is the network where the client is located after the success in the consensus judgment.

Figure 3:
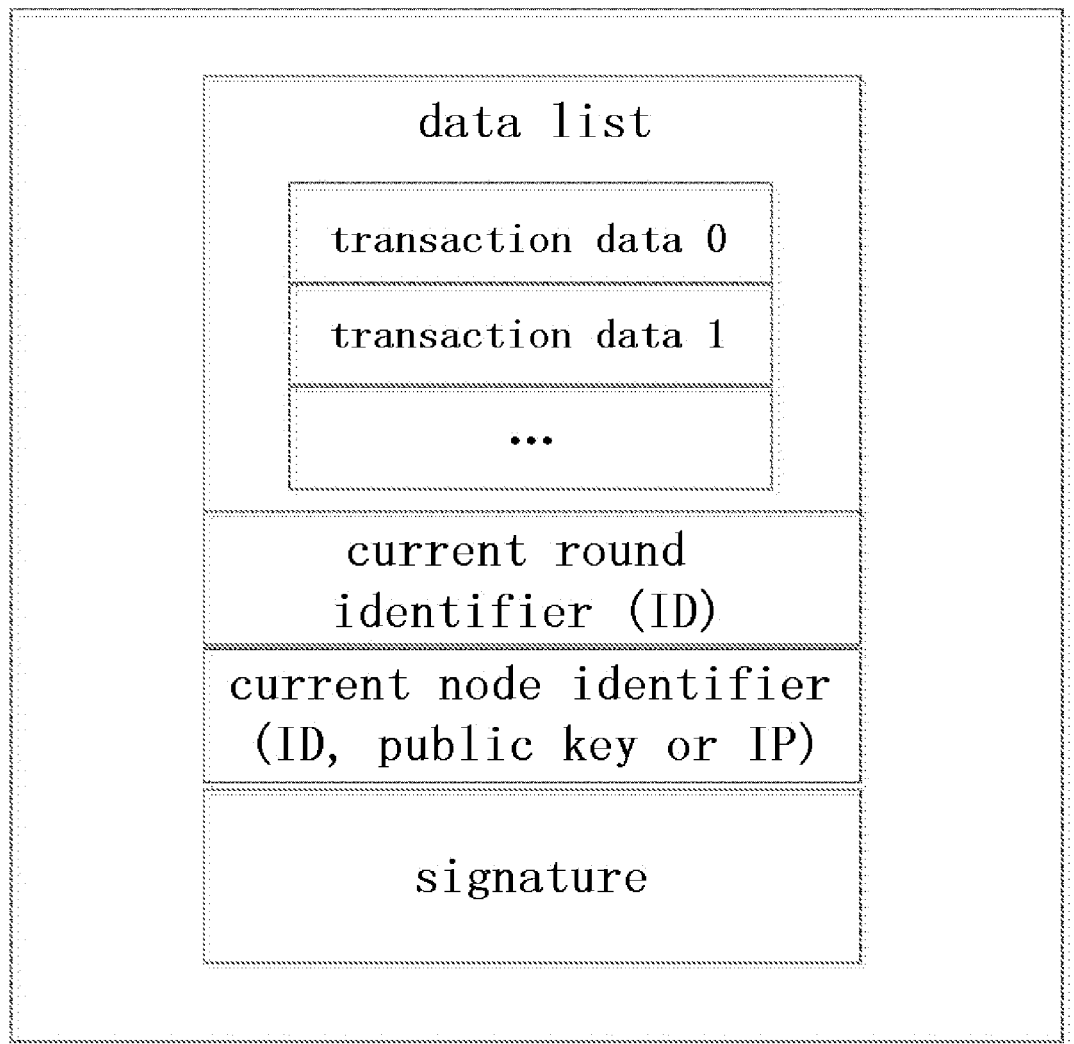
FIG. 3 is a schematic diagram of a proposal message according to an embodiment of the invention.

Since the Leader node is constantly sending transaction messages to the Leader node in the highest-priority network, the Leader node in the highest-priority network can generate a proposal message according to the transaction messages received within a period of time or a certain number of transaction messages, wherein the proposal message includes a data list, a consensus identifier in the current round, a leader node identifier in the highest-priority network, and a signature of the leader node in the highest-priority network, as shown in FIG. 3. The respective pieces of transaction data in the data list are arranged in sequence based on the transaction time, that is, the data to be written in blocks. For example, when the number of transaction messages received by the Leader node in the highest-priority network reaches 100, the 100 transaction messages will be packaged; or from the first transaction message received, the transaction messages received within 2 seconds are packaged into a proposal message. The default generation manner of the consensus identifier (CID) in the current round is self-increment.

The transaction message sent by the lower-level Leader node carries multi-level signatures. The Leader node in the highest-priority network is only required to perform a signature verification so as to determine the correctness of the transaction data, and packages the transaction messages into a proposal message after the success in the signature verification.

When the Leader node in the highest-priority network changes, the new Leader node can restart numbering, and make a broadcast to the Peer nodes in the same network and the lower-level Leader node after adding its own signature. There are many reasons for the change of the Leader node. For example, the Leader node itself exits abnormally (the other nodes will detect that the Leader node has no heartbeat), or there is a problem with the data sent by the Leader node (of course, this problem is not necessarily caused by the Leader node, but may be caused by the transmission process). Due to these cases, the other Peer nodes will consider that the Leader node is not safe enough, so they will be stimulated to trigger the re-election of the Leader node.

Optionally, the leader node identifier in the highest-priority network may be ID or IP of the leader node. However, IP has the problem of duplication, so ID is generally selected as the leader node identifier to ensure the uniqueness of the identifier. The proposal message may further carry the public key of the current node (i.e., the Leader node in the highest-priority network). Whether to carry the public key can be freely decided, for the public key itself is public and can be negotiated in advance, or can be carried in a message, which is not limited in the embodiments of the invention.

Optionally, performing a consensus judgment on the proposal message based on a Byzantine fault-tolerant consensus mechanism, comprises: the leader node in the highest priority network sending the proposal message to the leader node itself and the peer nodes in the highest-priority network; the leader node and the peer nodes receiving the proposal message, and performing a consensus judgment on the proposal message based on the Byzantine fault-tolerant consensus mechanism, respectively. As shown in FIG. 1, Leader00 in the highest-priority network sends the proposal message to Peer01, Peer02, Peer03, Peer04, and Leader00 itself in the same network, and all of Peer01, Peer02, Peer03, Peer04, and Leader00 will perform a consensus judgment on the proposal message based on the Byzantine fault-tolerant consensus mechanism.

Optionally, performing a consensus judgment on the proposal message based on a Byzantine fault-tolerant consensus mechanism, comprises: performing a signature verification on the proposal message, and generating a Write message according to the proposal message after the success in the verification, wherein the Write message includes a consensus identifier in the current round and a signature; broadcasting the Write message to all nodes in the current network; performing a signature verification and a consensus rule judgment on the received Write message, and generating a Accept message according to the Write message after the success in the judgment, wherein the Accept message includes a consensus identifier in the current round and a signature; broadcasting the Accept message to all nodes in the current network; performing a signature verification and a consensus rule judgment on the received Accept message.

Both the Peer node and the Leader node perform a signature verification and a CID sequential confirmation on the received proposal message; the Write message is broadcast to the other nodes in the same network and the current node itself after the success in the verification, and the Write message is not required to contain specific message content, but only requires the CID and the signature. Whether to carry the public key can be freely decided, for the public key itself is public and can be negotiated in advance, or can be carried in a message, which is not limited in the embodiments of the invention. After the other nodes in the same network and the current node receive the Write message, they verify the Write message and perform a consensus rule judgment. Specifically, a principle of N≥3f+1 can be adopted to reach a consensus, where N is the total number of nodes, and f is the number of evil nodes. For example, if there are 4 nodes participating in the consensus, 1 node is allowed to be abnormal (f is the number of evils), and if there are 7 nodes, 2 nodes are allowed to be abnormal.

After the success in the judgment, the Accept message is generated, and after the signature of the current node is attached, the Accept message is broadcast to the other nodes in the same network and the current node itself. Similar to the Write message, the Accept message only requires the CID and the signature. Whether to carry the public key can be freely decided, for the public key itself is public and can be negotiated in advance, or can be carried in a message, which is not limited in the embodiments of the invention. After the other nodes in the same network and the current node receive the Accept message, they verify the Accept message and perform a consensus rule judgment (e.g., N≥3f+1). If the judgment is successful, it means that the consensus in the current round is successful, and the transaction data in the proposal message can be written in the block.

Sending the proposal message to a leader node in a next-level network till the next-level network is the network where the client is located, comprises: a leader node in the highest-priority network sending the proposal message to a leader node in a next-priority network; the leader node in the next-level network receiving the proposal message, and performing a signature verification on the proposal message; writing transaction data in the proposal message in a block, attaching a signature of the leader node to the proposal message, and sending the proposal message to a peer node in the same network as the leader node and a leader node in a next-level network till the next-level network is the network where the client is located after the success in the signature verification; the peer node in the same network as the leader node receiving the proposal message sent by the leader node, and performing a signature verification on the proposal message; writing the transaction data in the proposal message in the block after the success in the signature verification.

The proposal message sent by the upper-level Leader node carries multi-level signatures. The Peer node in the same network as the upper-level Leader node and the lower-level Leader node are only required to perform a signature verification so as to determine the correctness of the transaction data, and write the transaction data in the block after the success in the signature verification. In the embodiments of the invention, for the lower-level Leader node, it is required to sign the proposal message of the consensus in the current round, and then broadcast the signed proposal message to the Peer nodes in the same network and the lower-level Leader node, and so on till the network where the client is located (i.e., the lowest-level network).

Optionally, after step 203, the method may further comprise: at least two nodes that are in the same network as the client and establish connections with the client receiving the proposal message, and performing a signature verification on the proposal message; writing transaction data in the proposal message in a block, and sending a response message to the client after the success in the signature verification.

As described in step 201, after ensuring the legitimacy of the transaction message, the client sends the transaction message to at least two nodes (Peer or Leader nodes) that are in the same network as the client to prevent individual nodes from cheating. Thus, the at least two nodes (Peer or Leader nodes) that are in the same network as the client and establish connections with the client will not only write the transaction data in the block, but also send the response message to the client after the success in the signature verification. Each Peer node does not know whether the other Peer nodes will respond to the client, and each Peer node that establishes a connection with the client will respond to the client.

The Byzantine fault-tolerant consensus mechanism (BFT) has advantages of a low energy consumption, a comparatively large throughput, and a short confirmation time. The embodiments of the invention combine the BFT with the peer-to-peer network to reach a consensus in the entire blockchain system in a peer-to-peer network environment, which can effectively improve the consensus efficiency and reduce the cost.

It can be seen according to the various embodiments described above that the invention adopts a technical means of performing a consensus judgment on the proposal message based on a Byzantine fault-tolerant consensus mechanism, and sending the proposal message to a leader node in a next-level network till the next-level network is the network where the client is located after the success in the consensus judgment to thereby solve the technical problems of a long transaction confirmation time and a small transaction volume carried by a block in the prior art. The embodiment of the invention, on the premise of using a cryptographic algorithm to ensure data consistency in a peer-to-peer network environment, performs a consensus based on the Byzantine fault-tolerant consensus mechanism, which can effectively improve the consensus efficiency; in the actual consensus process, fits well with a peer-to-peer network on the one hand, and can reduce a waste of resources caused by mining on the other hand by adopting a hierarchical regional consensus mechanism in a manner of reaching a consensus in a small range and issuing broadcasts, thereby effectively improving the consensus efficiency.

Figure 4:
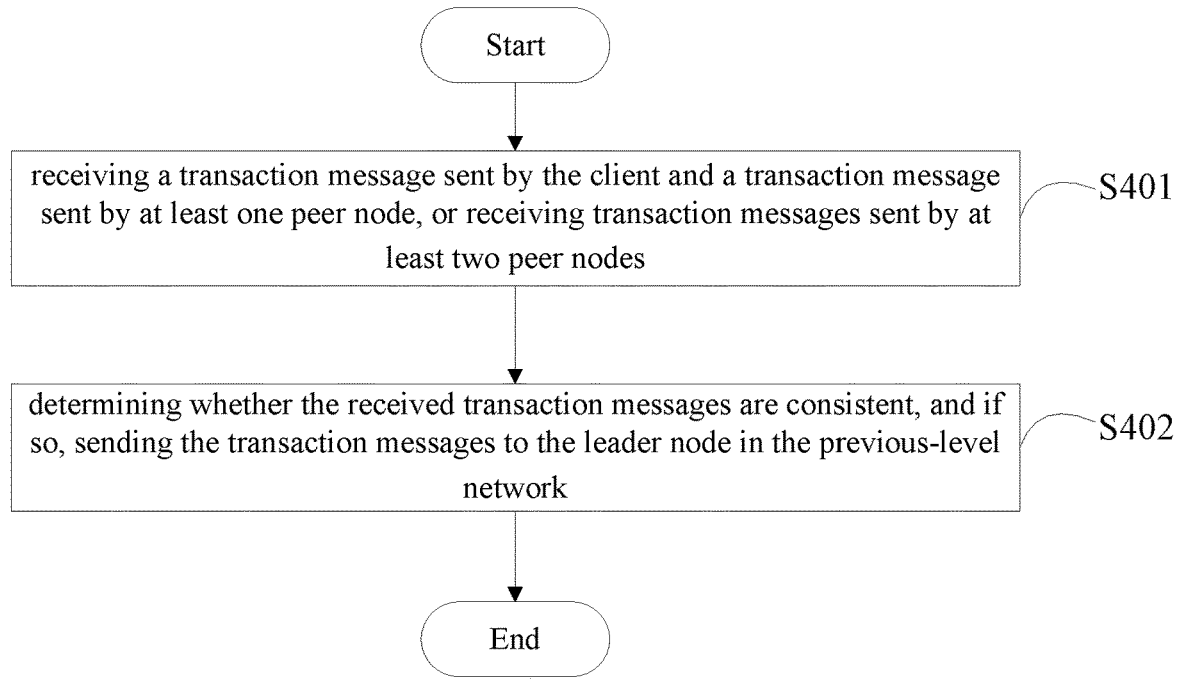
FIG. 4 is a schematic diagram of a main process of a blockchain consensus method according to another embodiment of the invention.

FIG. 4 is a schematic diagram of a main process of a blockchain consensus method according to another embodiment of the invention. The blockchain consensus method is applied to a leader node in the same network as a client, the method comprising: step 401: receiving a transaction message sent by the client and a transaction message sent by at least one peer node, or receiving transaction messages sent by at least two peer nodes, wherein the peer node is in the same network as both of the leader node and the client; step 402: determining whether the received transaction messages are consistent, and if so, sending the transaction messages to a leader node in a previous-level network.

After ensuring the legitimacy of the transaction message, the client sends the transaction message to at least two nodes (Peer or Leader nodes) that are in the same network as the client to prevent individual nodes from cheating. Specifically, the client can send the transaction message to the Leader node and at least one Peer node, and can also send the transaction message to at least two Peer nodes.

Optionally, the transaction message includes transaction data and a signature of the client. A cryptographic algorithm can be adopted to process the transaction data to ensure data consistency. Optionally, step 401 comprises: receiving the transaction message sent by the client and the transaction message sent by the at least one peer node, and performing a signature verification on the transaction messages, respectively; or receiving the transaction messages sent by the at least two peer nodes, and performing a signature verification on the transaction messages, respectively, wherein the transaction message sent by the peer node includes the transaction message sent by the client and a signature of the peer node. Since in step 201, the client sends the transaction message to the Peer node, the Peer node verifies the signature of the client by the public key of the client after receiving the transaction message sent by the client. Specifically, the transaction data in the transaction message is subjected to Hash processing, and it is compared whether the Hash value is consistent with the signature decrypted by the public key. If there is a success in the signature verification, the signature of the Peer signature is attached to the transaction message, and the transaction message after the attachment of the signature of the Peer signature is sent to the Leader node in the same network as the Peer node. Thus, the Leader node will receive the transaction message sent by the Peer node (forwarded by one or more Peer nodes), and may also receive the transaction message sent by the client, that is, the Leader node will receive at least two transaction messages. If the Leader node receives the transaction message sent by the Peer node, it first verifies the signature of the Peer node, and then performs a signature verification on the signature of the client after the success in the signature verification to thereby obtain transaction data. The first signature verification is to verify that the transaction message forwarded by the Peer node has not been tampered with during network transmission to ensure the authenticity of the transaction message forwarded by the Peer node; the second signature verification is to verify that the transaction data in the transaction message is sent by the client. If the Leader node receives the transaction message sent by the client, it is only required to verify the signature of the client to thereby obtain the transaction data.

Optionally, step 402 comprises: determining whether the transaction data in the respective transaction messages received are consistent based on a majority principle; if so, attaching a signature of the leader node to the transaction messages, and sending the transaction messages to the leader node in the previous-level network. If it is determined that the transaction data in the transaction messages are consistent, the Leader node will determine whether the Leader node itself has a parent Leader, and assuming that there is the parent Leader, it will add its own signature to the transaction messages and send the transaction messages to the parent Leader; the parent Leader will also perform the same operations (including the signature verification and the signature attachment) after receiving the messages till the current Leader node is the highest-level Leader. A verification of the respective transaction messages by the Leader node can ensure the consistency of the transaction data.

Figure 5:
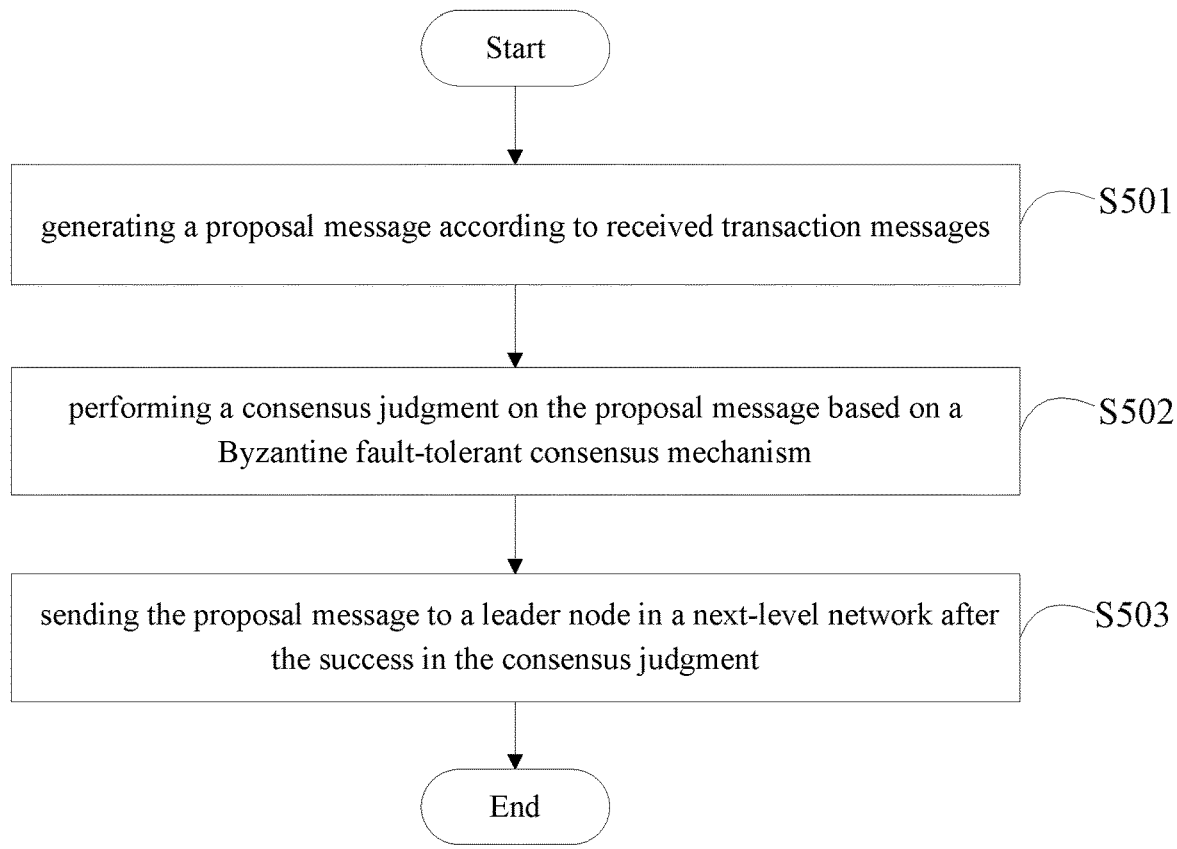
FIG. 5 is a schematic diagram of a main process of a blockchain consensus method according to a further embodiment of the invention.

FIG. 5 is a schematic diagram of a main process of a blockchain consensus method according to a further embodiment of the invention. The blockchain consensus method is applied to a leader node in a highest-priority network, the method comprising: step 501: generating a proposal message according to received transaction messages; step 502: performing a consensus judgment on the proposal message based on a Byzantine fault-tolerant consensus mechanism; step 503: sending the proposal message to a leader node in a next-level network after the success in the consensus judgment.

Since the Leader node is constantly sending transaction messages to the Leader node in the highest-priority network, the Leader node in the highest-priority network can generate a proposal message according to the transaction messages received within a period of time or a certain number of transaction messages, wherein the proposal message includes a data list, a consensus identifier in the current round, a leader node identifier in the highest-priority network, and a signature of the leader node in the highest-priority network.

Optionally, performing a consensus judgment on the proposal message based on a Byzantine fault-tolerant consensus mechanism, comprises: sending the proposal message to the leader node itself and a peer node in the highest-priority network; receiving the proposal message, and performing the consensus judgment on the proposal message based on the Byzantine fault-tolerant consensus mechanism.

Optionally, performing a consensus judgment on the proposal message based on a Byzantine fault-tolerant consensus mechanism, comprises: performing a signature verification on the proposal message, and generating a Write message according to the proposal message after the success in the verification, wherein the Write message includes a consensus identifier in the current round and a signature; broadcasting the Write message to all nodes in the current network; performing a signature verification and a consensus rule judgment on the received Write message, and generating an Accept message according to the Write message after the success in the judgment, wherein the Accept message includes a consensus identifier in the current round and a signature; broadcasting the Accept message to all nodes in the current network; and performing a signature verification and a consensus rule judgment on the received Accept message.

The invention further provides a blockchain consensus method, which is applied to a leader node in a medium-priority network, the method comprising: receiving a proposal message sent by a leader node in a highest-priority network, and performing a signature verification on the proposal message; writing transaction data in the proposal message in a block, attaching a signature of the leader node to the proposal message, and sending the proposal message to a peer node in the same network as the leader node and a leader node in a next-level network till the next-level network is the network where the client is located after the success in the signature verification.

The invention further provides a blockchain consensus method, which is applied to a peer node in the same network as a client, the method comprising: receiving a transaction message sent by the client, and performing a signature verification on the transaction message; attaching a signature of the peer node to the transaction message, and sending the transaction message to a leader node in the same network as the peer node after the success in the signature verification.

Optionally, the method further comprises: receiving a proposal message, and performing a signature verification on the transaction message; writing transaction data in the proposal message in a block, and sending a response message to the client after the success in the signature verification.

Figure 6:
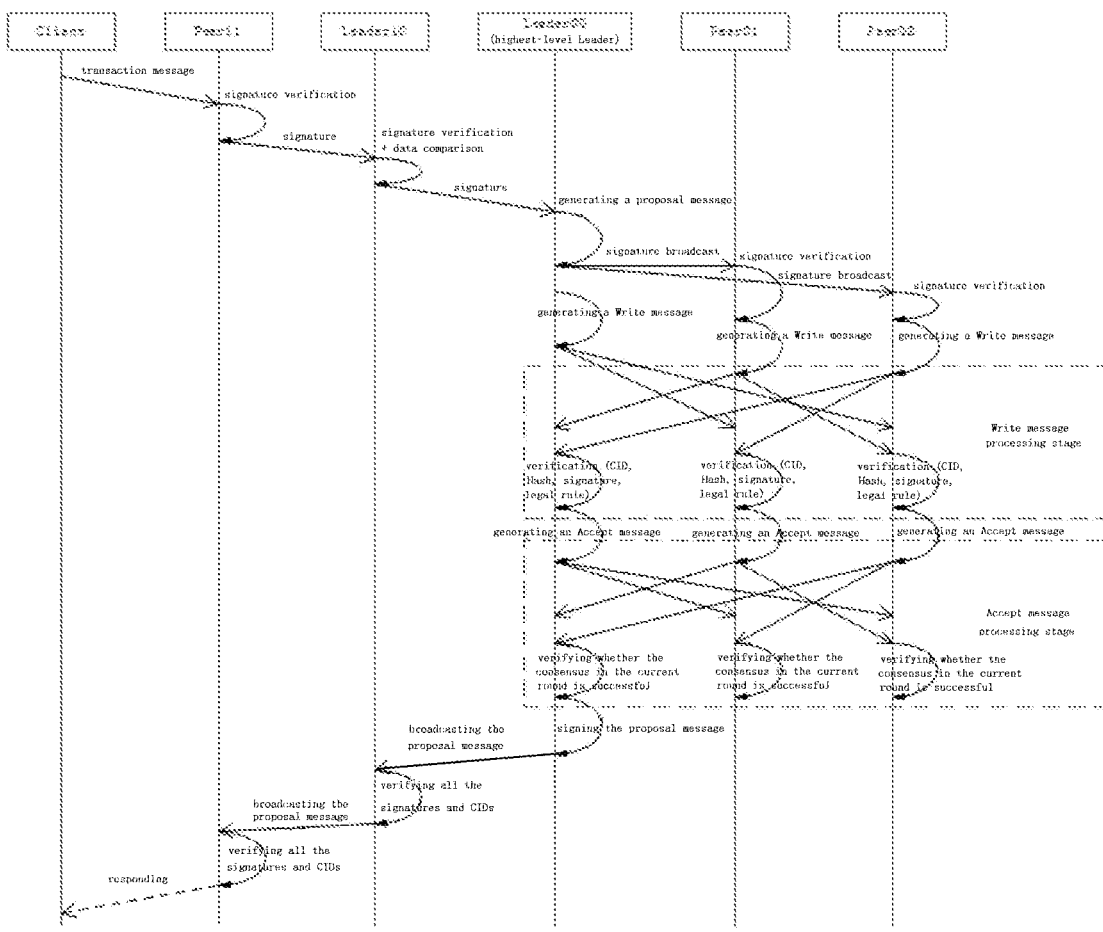
FIG. 6 is a schematic diagram of a main process of a blockchain consensus method according to a referable embodiment of the invention.

FIG. 6 is a schematic diagram of a main process of a blockchain consensus method according to a referable embodiment of the invention. The entire process is described in detail below with an example having only two-level Leader nodes. The blockchain consensus method may comprise the following steps:

Step 601: a client sending a transaction message to a Peer11 node, a Peer12 node, a Peer14 node, and a Leader10 node.

Specifically, the client may first subject the transaction data to Hash processing, and then process the Hash value using a private key of the client to thereby obtain the signature of the client. If a public key of the client is not broadcast to each node in advance, the transaction message should also carry the public key of the client for the node to verify the signature of the client.

Since the Peer11 node, the Peer12 node, the Peer14 node, and the Leader10 node are in the same network as the client and all establish connections with the client, after ensuring the legitimacy of the transaction message, the client broadcasts the transaction message, and the Peer11 node, the Peer12 node, the Peer14 node, and the Leader10 node receive the transaction message, respectively.

It should be noted that in order to simplify the schematic diagram, FIG. 6 exemplarily shows the process in which the Peer11 node receives the transaction message. Moreover, the client can also send the transaction message to the Peer11 node, the Peer12 node, and a Peer13 node, or to the Peer12 node and the Peer13 node, which is not limited in the embodiments of the invention, to prevent individual nodes from cheating.

Step 602: the Peer11 node receiving a transaction message sent by the client, and performing a signature verification on the transaction message; attaching a signature of the Peer11 node to the transaction message, and sending the transaction message to a Leader10 node after the success in the signature verification. The signature verifying and signing processes of the Peer12 node and the Peer14 node are similar to those of the Peer11 node, and no unnecessary details are further given.

Step 603: the Leader10 node receiving the transaction message sent by the client and the transaction message sent by the Peer11 node, the Peer12 node, and the Peer 14 node, and performing a signature verification on the transaction messages, respectively; determining whether the transaction data in the respective transaction messages received are consistent after the success in the signature verification; if so, attaching a signature of the Leader10 node to the transaction messages, and sending the transaction messages to a Leader00 node in the previous-level network.

If the Leader10 node receives the transaction message sent by the Peer node, it first verifies the signature of the Peer node, and then performs a signature verification on the signature of the client after the success in the signature verification to thereby obtain transaction data.

Step 604: the Leader00 node generating a proposal message according to received transaction messages, and sending the proposal message to the Leader00 node as well as the Peer01 node, the Peer02 node, the Peer03 node, and the Peer04 node.

In order to simplify the schematic diagram, FIG. 6 exemplarily shows the Peer01 node and the Peer02 node, the execution processes of the respective Peer nodes in the same network as the Leader00 node are similar, and no unnecessary details are further given.

Step 605: the Leader00 node, the Peer01 node, the Peer02 node, the Peer03 node, and the Peer04 node performing a signature verification on the proposal message, generating a Write message according to the proposal message after the success in the verification, and broadcasting the Write message to all nodes in the current network.

Both the Peer node and the Leader node perform a signature verification and a CID sequential confirmation on the received proposal message; the Write message is broadcast to the other nodes in the same network and the current node itself after the success in the verification, and the Write message is not required to contain specific message content, but only requires the CID and the signature.

Step 606: the Leader00 node, the Peer01 node, the Peer02 node, the Peer03 node, and the Peer04 node receiving the Write message, performing a signature verification and a consensus rule judgment on the Write message, generating an Accept message according to the Write message after the success in the judgment, and broadcasting the Accept message to all nodes in the current network.

Specifically, the CID sequential confirmation is mainly performed, the signature is verified by Hash, and the consensus rule judgment is performed by a legal rule (a principle of N≥3f+1).

Step 607: the Leader00 node, Peer01 node, Peer02 node, Peer03 node, and Peer04 node receiving the Accept message, and performing a signature verification and a consensus rule judgment on the Accept message, wherein if the judgment is successful, it means that the consensus in the current round is successful.

Step 608: the Leader00 node writing transaction data in the proposal message in a block, and sending the proposal message to the Leader10 node in the next-level network after signing it; the Peer01 node, the Peer02 node, the Peer03 node, and the Peer04 node writing the transaction data in the proposal message in the block.

Step 609: the Leader10 node receiving the proposal message, and performing a signature verification on the proposal message; writing transaction data in the proposal message in a block, attaching a signature of the Leader10 node to the proposal message, and then broadcasting the proposal message to the Peer11 node, the Peer12 node, the Peer13 node, and the Peer14 node after the success in the signature verification.

Step 610: the Peer11 node, the Peer12 node, the Peer13 node, and the Peer14 receiving the proposal message sent by the Leader10 node, and performing a signature verification on the proposal message; writing the transaction data in the proposal message in the block after the success in the signature verification.

Step 611: the Peer11 node, the Peer12 node, the Peer14 node, and the Leader10 node sending a response message to the client after the success in the signature verification.

In addition, detailed descriptions of the specific implementation content of the blockchain consensus method in a referable embodiment of the invention have been given in the above blockchain consensus method, so no details of repeated content are further given herein.

Figure 7:
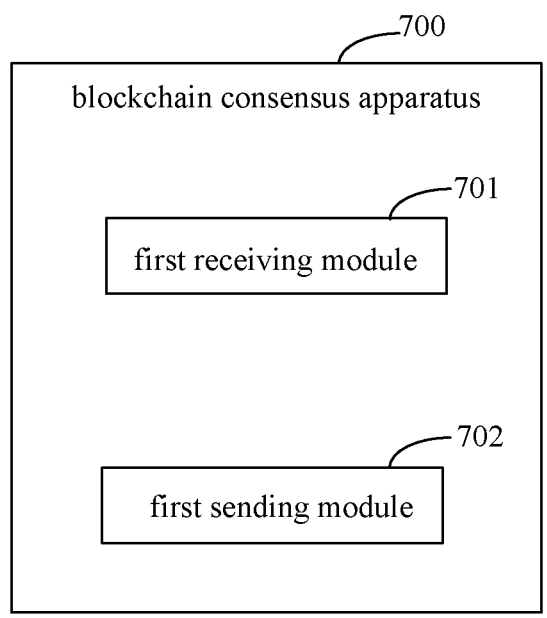
FIG. 7 is a schematic diagram of main modules of a blockchain consensus apparatus according to an embodiment of the invention.

FIG. 7 is a schematic diagram of main modules of a blockchain consensus apparatus according to an embodiment of the invention. As shown in FIG. 7, a blockchain consensus apparatus 700 is provided in a leader node in the same network as a client, the apparatus 700 comprising: a first receiving module 701 for receiving a transaction message sent by the client and a transaction message sent by at least one peer node, or receiving transaction messages sent by at least two peer nodes, wherein the peer node is in the same network as both of the leader node and the client; a first sending module 702 for determining whether the received transaction messages are consistent, and if so, sending the transaction messages to a leader node in a previous-level network.

Optionally, the transaction message includes transaction data and a signature of the client;

receiving a transaction message sent by the client and a transaction message sent by at least one peer node, or receiving transaction messages sent by at least two peer nodes, comprises:

receiving the transaction message sent by the client and the transaction message sent by the at least one peer node, and performing a signature verification on the transaction messages, respectively; or receiving the transaction messages sent by the at least two peer nodes, and performing a signature verification on the transaction messages, respectively, wherein the transaction message sent by the peer node includes the transaction message sent by the client and a signature of the peer node.

Optionally, determining whether the received transaction messages are consistent, and if so, sending the transaction messages to a leader node in a previous-level network further, comprises:

determining whether the transaction data in the respective transaction messages received are consistent based on a majority principle;

if so, attaching a signature of the leader node to the transaction messages, and sending the transaction messages to the leader node in the previous-level network.

Figure 8:
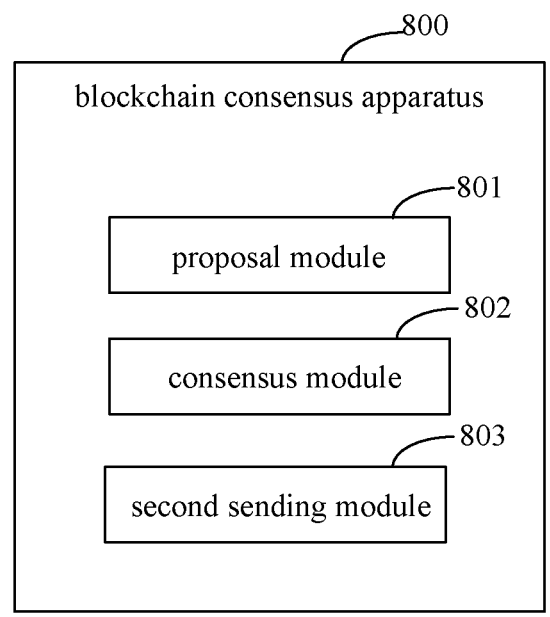
FIG. 8 is a schematic diagram of main modules of a blockchain consensus apparatus according to another embodiment of the invention.

FIG. 8 is a schematic diagram of main modules of a blockchain consensus apparatus according to another embodiment of the invention. A shown in FIG. 8, a blockchain consensus apparatus 800 is provided in a leader node in a highest-priority network, the apparatus 800 comprising: a proposal module 801 for generating a proposal message according to received transaction messages; a consensus module 802 for performing a consensus judgment on the proposal message based on a Byzantine fault-tolerant consensus mechanism; a second sending module 803 sending the proposal message to a leader node in a next-level network after the success in the consensus judgment.

Optionally, generating a proposal message according to the received transaction messages, comprises:

generating the proposal message according to the transaction messages received within a preset period of time or a preset number of transaction messages, wherein the proposal message includes a data list, a consensus identifier in the current round, a leader node identifier in the highest-priority network, and a signature of the leader node in the highest-priority network.

Optionally, performing a consensus judgment on the proposal message based on a Byzantine fault-tolerant consensus mechanism, comprises:

sending the proposal message to the leader node itself and a peer node in the highest-priority network;

receiving the proposal message, and performing the consensus judgment on the proposal message based on the Byzantine fault-tolerant consensus mechanism.

Optionally, performing a consensus judgment on the proposal message based on a Byzantine fault-tolerant consensus mechanism, comprises:

performing a signature verification on the proposal message, and generating a Write message according to the proposal message after the success in the verification, wherein the Write message includes a consensus identifier in the current round and a signature;

broadcasting the Write message to all nodes in the current network;

performing a signature verification and a consensus rule judgment on the received Write message, and generating an Accept message according to the Write message after the success in the judgment, wherein the Accept message includes a consensus identifier in the current round and a signature;

broadcasting the Accept message to all nodes in the current network; and performing a signature verification and a consensus rule judgment on the received Accept message.

The embodiments of the invention further provide a blockchain consensus apparatus, which is provided in a leader node in a medium-priority network, the apparatus comprising: a second receiving module for receiving a proposal message sent by a leader node in a highest-priority network, and performing a signature verification on the proposal message; a writing module for writing transaction data in the proposal message in a block, attaching a signature of the leader node to the proposal message, and sending the proposal message to a peer node in the same network as the leader node and a leader node in a next-level network till the next-level network is the network where the client is located after the success in the signature verification.

The embodiments of the invention further provide a blockchain consensus apparatus, which is provided in a peer node in the same network as a client, the apparatus comprising: a third receiving module for receiving a transaction message sent by the client, and performing a signature verification on the transaction message; a third sending module for attaching a signature of the peer node to the transaction message, and sending the transaction message to a leader node in the same network as the peer node after the success in the signature verification.

Optionally, the blockchain consensus apparatus further comprises: a fourth receiving module for receiving a proposal message, and performing a signature verification on the proposal message; writing transaction data in the proposal message in a block, and sending a response message to the client after the success in the signature verification.

The invention further provides a blockchain consensus system, comprising: a client for sending a transaction message to at least two nodes in the same network as the client, wherein the at least two nodes include at least two of leader nodes and peer nodes; a leader node in the same network as the client for receiving the transaction message sent by the client and a transaction message sent by at least one of the peer nodes, or receiving transaction messages sent by at least two of the peer nodes; sending the transaction messages to a leader node in a previous-level network till the priority of the previous-level network is the highest if transaction data in the transaction messages are consistent; a leader node in the highest-priority network for generating a proposal message according to the received transaction messages, and performing a consensus judgment on the proposal message based on a Byzantine fault-tolerant consensus mechanism; sending the proposal message to a leader node in a next-level network till the next-level network is the network where the client is located after the success in the consensus judgment.

Optionally, the transaction message includes transaction data and a signature of the client;

the system further comprises: a peer node in the same network as the client for receiving a transaction message sent by the client, and performing a signature verification on the transaction message; attaching a signature of the peer node to the transaction message, and sending the transaction message to a leader node in the same network as the peer node after the success in the signature verification; or a leader node in the same network as the client is further used for: receiving the transaction message sent by the client and the transaction message sent by the at least one peer node, and performing a signature verification on the transaction messages, respectively; or receiving the transaction messages sent by the at least two peer nodes, and performing a signature verification on the transaction messages, respectively.

Optionally, the leader node in the same network as the client is further used for:

determining whether the transaction data in the respective transaction messages received are consistent based on a majority principle; if so, attaching a signature of the leader node to the transaction messages, and sending the transaction messages to the leader node in the previous-level network.

The system further comprises: the leader node in the previous-level network for performing a signature verification on the received transaction messages; attaching a signature of the leader node to the transaction messages, and sending the transaction messages to the leader node in the previous-level network till the priority of the previous-level network is the highest after the success in the signature verification.

Optionally, the leader node in the highest-priority network is further used for:

generating the proposal message according to the transaction messages received within a preset period of time or a preset number of transaction messages, wherein the proposal message includes a data list, a consensus identifier in the current round, a leader node identifier in the highest-priority network, and a signature of the leader node in the highest-priority network.

Optionally, the system further comprises a peer node in the highest-priority network;

the leader in the highest-priority network is further used for: sending the proposal message to the leader node itself and a peer node in the highest-priority network;

the leader node and the peer node are used for receiving the proposal message, and performing the consensus judgment on the proposal message based on the Byzantine fault-tolerant consensus mechanism, respectively.

Optionally, performing a consensus judgment on the proposal message based on a Byzantine fault-tolerant consensus mechanism, comprises:

performing a signature verification on the proposal message, and generating a Write message according to the proposal message after the success in the verification, wherein the Write message includes a consensus identifier in the current round and a signature;

broadcasting the Write message to all nodes in the current network;

performing a signature verification and a consensus rule judgment on the received Write message, and generating an Accept message according to the Write message after the success in the judgment, wherein the Accept message includes a consensus identifier in the current round and a signature;

broadcasting the Accept message to all nodes in the current network; and performing a signature verification and a consensus rule judgment on the received Accept message.

Optionally, the leader node in the highest-priority network is further used for: sending the proposal message to a leader node in a next-level network;

the leader node in the next-level network is further used for: receiving the proposal message, and performing a signature verification on the proposal message; writing transaction data in the proposal message in a block, attaching a signature of the leader node to the proposal message, and sending the proposal message to a peer node in the same network as the leader node and a leader node in a next-level network till the next-level network is the network where the client is located after the success in the signature verification;

the peer node in the same network as the leader node is used for: receiving the proposal message sent by the leader node, and performing a signature verification on the proposal message; writing the transaction data in the proposal message in the block after the success in the signature verification.

Optionally, at least two nodes that are in the same network as the client and establish connections with the client are further used for: receiving the proposal message, and performing a signature verification on the proposal message; writing transaction data in the proposal message in a block, and sending a response message to the client after the success in the signature verification.

It can be seen according to the various embodiments described above that the invention adopts a technical means of performing a consensus judgment on the proposal message based on a Byzantine fault-tolerant consensus mechanism, and sending the proposal message to a leader node in a next-level network till the next-level network is the network where the client is located after the success in the consensus judgment to thereby solve the technical problems of a long transaction confirmation time and a small transaction volume carried by a block in the prior art. The embodiment of the invention, on the premise of using a cryptographic algorithm to ensure data consistency in a peer-to-peer network environment, performs a consensus based on the Byzantine fault-tolerant consensus mechanism, which can effectively improve the consensus efficiency; in the actual consensus process, fits well with a peer-to-peer network on the one hand, and can reduce a waste of resources caused by mining on the other hand by adopting a hierarchical regional consensus mechanism in a manner of reaching a consensus in a small range and issuing broadcasts, thereby effectively improving the consensus efficiency.

It should be noted that detailed descriptions of the specific implementation content of the blockchain consensus system according to the invention have been given in the above blockchain consensus method, so no details of repeated content are further given herein.

Figure 9:
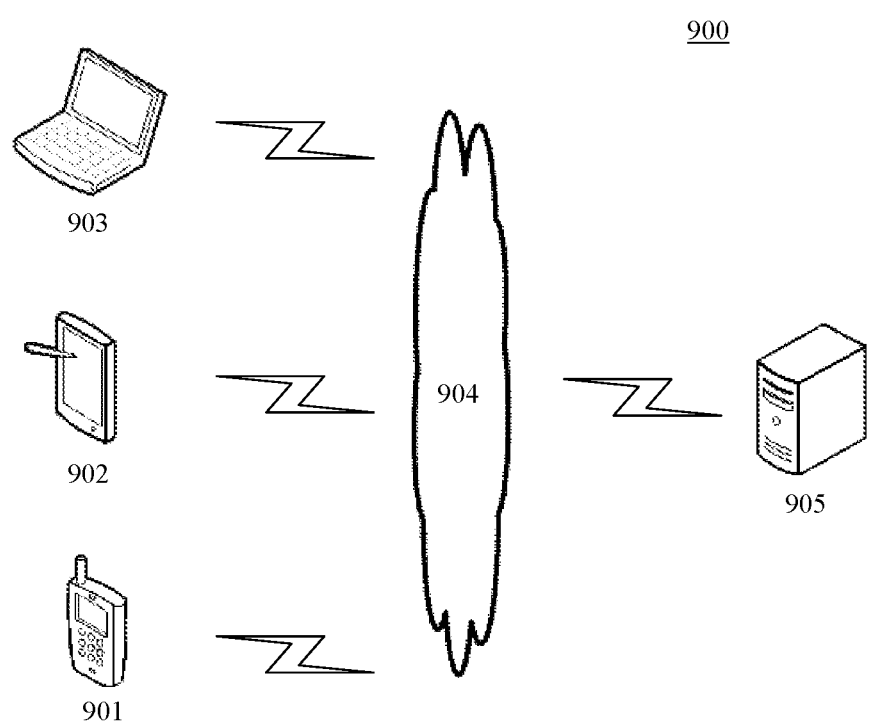
FIG. 9 is an exemplary system architecture diagram to which an embodiment of the invention can be applied.

FIG. 9 shows an exemplary system architecture 900 to which a blockchain consensus method or a blockchain consensus system according to an embodiment of the invention can be applied.

As shown in FIG. 9, the system architecture 900 may comprise terminal devices 901, 902, 903, a network 904, and a server 905. The network 904 is a medium for providing a communication link between the terminal devices 901, 902, 903 and the server 905. The network 904 may include various connection types, such as wired or wireless communication links, or fiber-optic cables.

The user may use the terminal devices 901, 902, 903 to interact with the server 905 through the network 904 to receive or send messages and so on. Various communication client applications, such as shopping applications, web browser applications, search applications, instant messaging tools, email clients, social platform software and so on (only examples), may be installed on the terminal devices 901, 902, 903.

The terminal devices 901, 902, 903 may be various electronic devices having screens and supporting web browsing, including but not limited to smart phones, tablet computers, laptop portable computers, desktop computers and so on.

The server 905 may be a server that provides various services, such as a background management server that provides support for shopping websites browsed by the user using the terminal devices 901, 902, 903 (only an example). The background management server may process, for example, analyze the received request for querying product information and other data, and feed the processing results (such as target push information and product information—only examples) back to the terminal devices.

It shall be understood that the numbers of the terminal devices, the networks, and the servers in FIG. 9 are merely schematic. According to implementation requirements, there may be any numbers of the terminal devices, the networks, and the servers.

Figure 10:
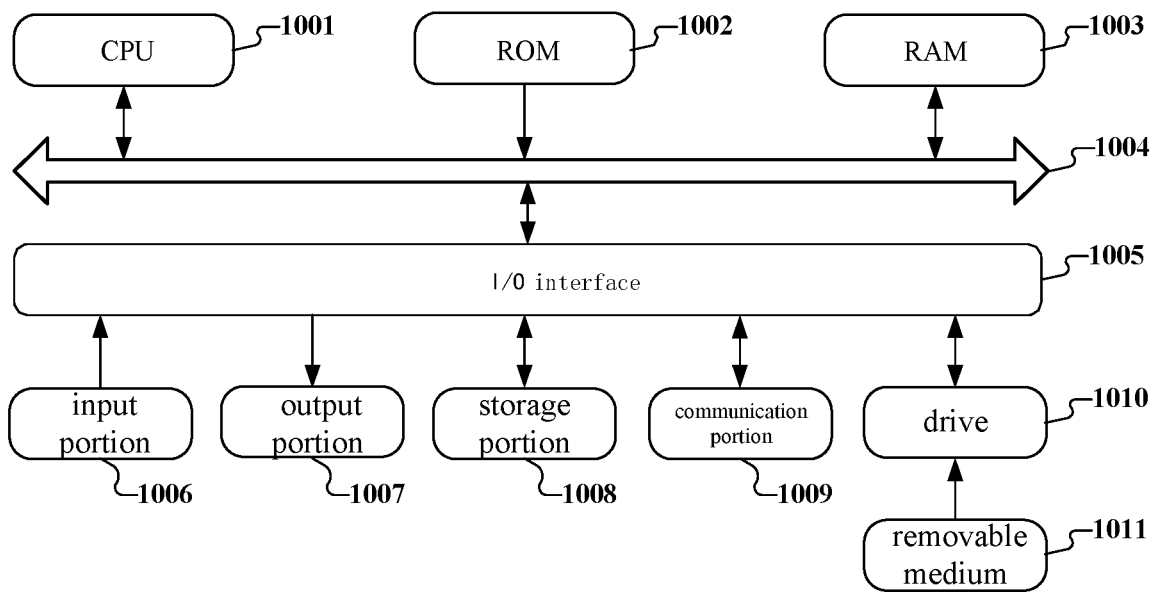
FIG. 10 is a schematic diagram of a structure of a computer system suitable for implementing a terminal device or a server according to an embodiment of the invention.

Reference is now made to FIG. 10, which shows a schematic diagram of a structure of a computer system 1000 suitable for implementing a terminal device according to an embodiment of the invention. The terminal device shown in FIG. 10 is only an example, and shall not impose any limitation on the functions and the scope of use of the embodiment of the invention.

As shown in FIG. 10, the computer system 1000 includes a central processing unit (CPU) 1001, which may perform various appropriate actions and processes according to a program stored in a read-only memory (ROM) 1002 or a program loaded from a storage portion 1008 into a random access memory (RAM) 1003. Various programs and data required for the operation of the system 1000 are also stored in the RAM 1003. The CPU 1001, the ROM 1002 and the RAM 1003 are connected to each other through a bus 1004. An input/output (I/O) interface 1005 is also connected to the bus 1004.

The following components are connected to the I/O interface 1005: an input portion 1006 including a keyboard, a mouse and so on; an output portion 1007 including a cathode ray tube (CRT), a liquid crystal display (LCD) and so on, and a speaker and so on; a storage portion 1008 including a hard disk and so on; and a communication portion 1009 including a network interface card such as a LAN card, a modem and so on. The communication portion 1009 performs communication processing via a network such as the Internet. A drive 1010 is also connected to the I/O interface 1005 according to requirements. A removable medium 1011, such as a magnetic disk, an optical disk, a magneto-optical disk, a semiconductor memory and so on, is installed on the drive 1010 according to requirements so that a computer program read therefrom is installed in the storage portion 1008 according to requirements.

In particular, according to the embodiment disclosed in the invention, the process described above with reference to the flowchart may be implemented as a computer software program. For example, the embodiment disclosed in the invention includes a computer program product, which includes a computer program carried on a computer-readable medium, the computer program containing a program code for performing the method shown in the flowchart. In such embodiment, the computer program may be downloaded and installed from the network through the communication portion 1009, and/or installed from the removable medium 1011. When the computer program is executed by the central processing unit (CPU) 1001, the above functions defined in the system according to the invention are executed.

It shall be noted that the computer-readable medium shown in the invention may be a computer-readable signal medium or a computer-readable storage medium or any combination of the above two media. The computer-readable storage medium may be, for example, but not limited to, an electronic, magnetic, optical, electromagnetic, infrared, or semiconductor system, apparatus or device, or any combination thereof. More specific examples of the computer-readable storage medium may include, but are not limited to, an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the invention, the computer-readable storage medium may be any tangible medium containing or storing a program, and the program may be used by or in combination with an instruction execution system, apparatus or device. In the invention, the computer-readable signal medium may include a data signal propagated in a baseband or propagated as a part of a carrier wave, in which a computer-readable program code is carried. Such propagated data signal may adopt many forms, including but not limited to electromagnetic signals, optical signals, or any suitable combination thereof. The computer-readable signal medium may be also any computer-readable medium other than the computer-readable storage medium, and the computer-readable medium may send, propagate, or transmit a program for use by or in connection with the instruction execution system, apparatus or device. The program code contained on the computer-readable medium may be transmitted using any appropriate medium, including but not limited to wireless, wire, optical cable, RF and so on, or any suitable combination thereof.

The flowcharts and block diagrams in the figures illustrate architectures, functions and operations that may be implemented by systems, methods and computer program products according to various embodiments of the invention. In this regard, each block in the flowcharts or block diagrams may represent a module, a program segment, or a part of a code, which contains one or more executable instructions for implementing specified logic functions. It shall be also noted that in some alternative implementations, the functions labeled in the blocks may also occur in an order different from that labeled in the figures. For example, two successively represented blocks may actually be executed substantially in parallel, and they may sometimes be executed in a reverse order, which depends on the functions involved. It shall be also noted that each block in the block diagrams or flowcharts, and combinations of the blocks in the block diagrams or flowcharts may be implemented with a dedicated hardware-based system that performs specified functions or operations, or may be implemented with a combination of dedicated hardware and computer instructions.

The involved modules described in the embodiment of the invention may be implemented by software or hardware. The described modules may be also provided in a processor. For example, a description may be made as follows: a processor comprises a first receiving module and a first sending module, wherein the names of these modules do not form limitations of the modules themselves in some cases.

As another aspect, the invention also provides a computer-readable medium, which may be included in the devices described in the above embodiment, or may exist independently without being assembled into the devices. The above computer-readable medium carries one or more programs, and the one or more programs, when executed by one of the devices, cause the device to include receiving a transaction message sent by the client and a transaction message sent by at least one peer node, or receiving transaction messages sent by at least two peer nodes, wherein the peer node is in the same network as both of the leader node and the client; determining whether the received transaction messages are consistent, and if so, sending the transaction messages to a leader node in a previous-level network.

The technical solution according to the embodiment of the invention overcomes the technical problems of a long transaction confirmation time and a small transaction volume carried by a block in the prior art because it adopts a technical means of performing a consensus judgment on the proposal message based on a Byzantine fault-tolerant consensus mechanism, and sending the proposal message to a leader node in a next-level network till the next-level network is the network where the client is located after the success in the consensus judgment. The embodiment of the invention, on the premise of using a cryptographic algorithm to ensure data consistency in a peer-to-peer network environment, performs a consensus based on the Byzantine fault-tolerant consensus mechanism, which can effectively improve the consensus efficiency; in the actual consensus process, fits well with a peer-to-peer network on the one hand, and can reduce a waste of resources caused by mining on the other hand by adopting a hierarchical regional consensus mechanism in a manner of reaching a consensus in a small range and issuing broadcasts, thereby effectively improving the consensus efficiency.

The above specific implementation modes do not form limitations on the scope of protection of the invention. It shall be understood by those skilled in the art that various modifications, combinations, sub-combinations and substitutions may occur depending on design requirements and other factors. Any modification, equivalent replacement, improvement and so on made within the spirit and principle of the invention shall be included in the scope of protection of the invention.

The invention claimed is:

1. A blockchain consensus method, comprising:
    dividing a peer-to-peer network into multiple sub-networks with different priorities, wherein each sub-network includes a plurality of nodes, and the plurality of nodes include at least one leader node capable of communicating with external network and at least one peer node;
    receiving, by a leader node in the same sub-network as a client, a transaction message sent by the client and a transaction message sent by at least one peer node, or receiving transaction messages sent by at least two peer nodes;
    determining whether the received transaction messages are consistent, and if so, sending the transaction messages to a leader node in an upper-level sub-network till the upper-level sub-network is a highest-priority sub-network,
    generating, by the leader node in the highest-priority sub-network, a proposal message according to received transaction messages, and performing a consensus judgment on the proposal message based on a Byzantine fault-tolerant consensus mechanism; and
    sending the proposal message to a leader node in a lower-level sub-network till the lower-level sub-network is the sub-network where the client is located after the success in the consensus judgment,
    wherein, sending the proposal message to a leader node in a next-level network till the next-level network is the network where the client is located, comprises:
        a leader node in the highest-priority network sending the proposal message to a leader node in a next-priority network;
        the leader node in the next-level network receiving the proposal message, and performing a signature verification on the proposal message;
        after the success in the signature verification, writing transaction data in the proposal message in a block, attaching a signature of the leader node to the proposal message, and sending the proposal message to a peer node in the same network as the leader node and a leader node in a next-level network till the next-level network is the network where the client is located after the success in the signature verification;
        the peer node in the same network as the leader node receiving the proposal message sent by the leader node, and performing a signature verification on the proposal message; and
        writing the transaction data in the proposal message in the block after the success in the signature verification.

2. The method of claim 1, wherein the transaction message sent by the client includes transaction data and a signature of the client;
    the step of receiving, by the leader node in the same sub-network as the client, a transaction message sent by the client and a transaction message sent by at least one peer node, or receiving transaction messages sent by at least two peer nodes comprises:
        receiving the transaction message sent by the client and the transaction message sent by the at least one peer node, and performing a signature verification on the transaction messages, respectively; or receiving the transaction messages sent by the at least two peer nodes, and performing a signature verification on the transaction messages, respectively,
        wherein each transaction message sent by the peer node includes the transaction message sent by the client and a signature of the peer node.

3. The method of claim 1, wherein determining, by the leader node in the same sub-network as the client, whether the transaction data in the respective transaction messages are consistent based on a majority principle;
    if so, attaching a signature of the leader node in the current sub-network to the transaction messages, and sending the transaction messages to the leader node in the upper-level sub-network.

4. The method of claim 1, further comprising:
receiving, by a peer node in the same sub-network as the client, a transaction message sent by the client, and performing a signature verification on the transaction message;
attaching a signature of the peer node to the transaction message, and sending the transaction message to a leader node in the same sub-network as the peer node after the success in the signature verification.

5. The method of claim 4, further comprising:
receiving, by the peer node in the same sub-network as the client, a proposal message, and performing a signature verification on the transaction message;
writing transaction data in the proposal message in a block, and sending a response message to the client after the success in the signature verification.

6. The method of claim 1, wherein the step of generating by the leader node in the highest-priority sub-network a proposal message according to the received transaction messages further comprises:
generating the proposal message according to the transaction messages received within a preset period of time or a preset number of transaction messages,
wherein the proposal message includes a data list, a consensus identifier in the current round, a leader node identifier in the highest-priority sub-network, and a signature of the leader node in the highest-priority sub-network.

7. The method of claim 1, wherein the step of performing a consensus judgment on the proposal message based on a Byzantine fault-tolerant consensus mechanism further comprises:
sending the proposal message to the leader node itself in the highest-priority sub-network and a peer node in the highest-priority sub-network;
receiving the proposal message, and performing the consensus judgment on the proposal message based on the Byzantine fault-tolerant consensus mechanism.

8. The method of claim 7, wherein the step of performing a consensus judgment on the proposal message based on a Byzantine fault-tolerant consensus mechanism further comprises:
performing a signature verification on the proposal message, and generating a Write message according to the proposal message after the success in the verification, wherein the Write message includes a consensus identifier in the current round and a signature;
broadcasting the Write message to all nodes in the current highest-priority sub-network;
performing a signature verification and a consensus rule judgment on the received Write message, and generating an Accept message according to the Write message after the success in the judgment, wherein the Accept message includes a consensus identifier in the current round and a signature;
broadcasting the Accept message to all nodes in the current highest-priority sub-network; and
performing a signature verification and a consensus rule judgment on the received Accept message.

9. An electronic device, comprising:
one or more processors;
a non-transitory storage means for storing one or more programs, the one or more programs, when executed by the one or more processors, causing the one or more processors to implement the method according to claim 1.

10. A non-transitory computer-readable medium, on which a computer program is stored, the program, when executed by a processor, implementing the method according to claim 1.

11. A blockchain consensus system, comprising:
a peer-to-peer network which is divided into multiple sub-networks with different priorities, wherein each sub-network includes a plurality of nodes, and the plurality of nodes include at least one leader node capable of communicating with external network and at least one peer node;
a client for sending a transaction message to at least two nodes in the same sub-network as the client, wherein the at least two nodes include at least two of leader nodes and peer nodes;
a leader node in the same sub-network as the client for receiving the transaction message sent by the client and a transaction message sent by at least one of the peer nodes, or receiving transaction messages sent by at least two of the peer nodes; if transaction data in the transaction messages are consistent, sending the transaction messages to a leader node in an upper-level sub-network till the upper-level sub-network is a highest-priority sub-network; and
a leader node in the highest-priority sub-network for generating a proposal message according to the received transaction messages, and performing a consensus judgment on the proposal message based on a Byzantine fault-tolerant consensus mechanism; sending the proposal message to a leader node in a lower-level sub-network till the lower-level sub-network is the network where the client is located after the success in the consensus judgment,
wherein, sending the proposal message to a leader node in a next-level network till the next-level network is the network where the client is located, comprises:
a leader node in the highest-priority network sending the proposal message to a leader node in a next-priority network;
the leader node in the next-level network receiving the proposal message, and performing a signature verification on the proposal message;
after the success in the signature verification, writing transaction data in the proposal message in a block, attaching a signature of the leader node to the proposal message, and sending the proposal message to a peer node in the same network as the leader node and a leader node in a next-level network till the next-level network is the network where the client is located after the success in the signature verification;
the peer node in the same network as the leader node receiving the proposal message sent by the leader node, and performing a signature verification on the proposal message; and
writing the transaction data in the proposal message in the block after the success in the signature verification.

* * * * *